April 12, 1966 H. WARD 3,245,517
SLATTED-TYPE CONVEYOR
Filed June 12, 1964 4 Sheets-Sheet 1

Inventor
HARRY WARD

By
Bailey, Stephens+Huetig
Attorneys

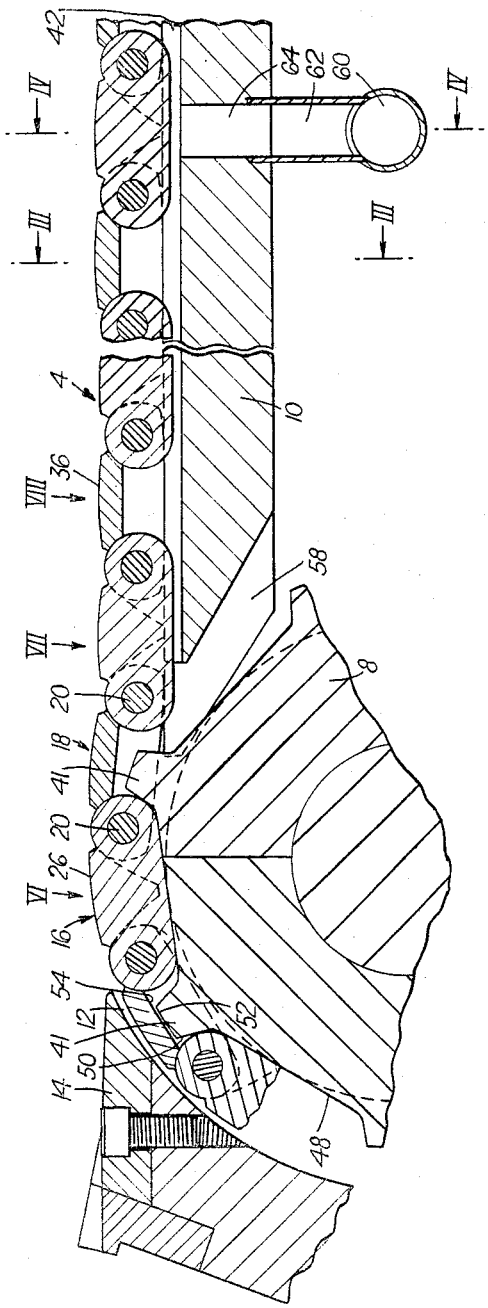

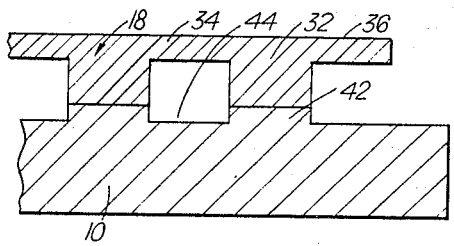
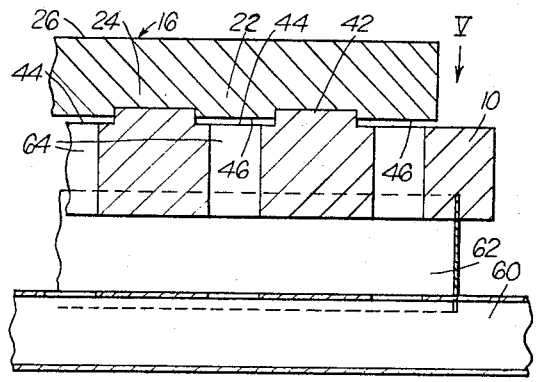
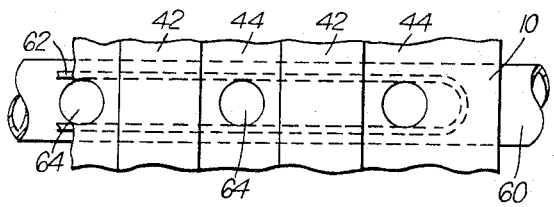

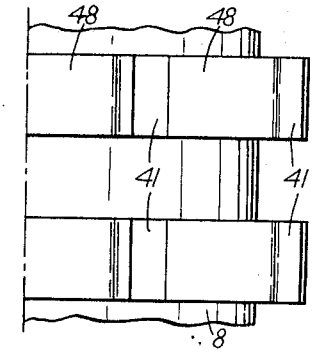
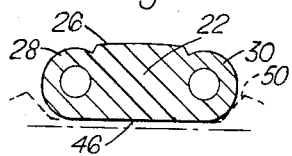
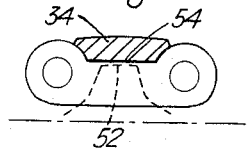
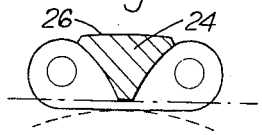
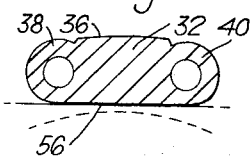
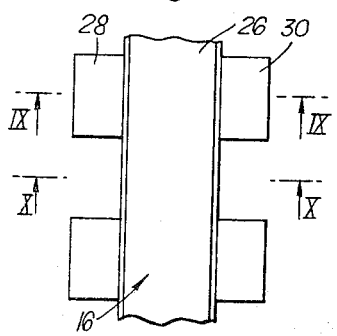
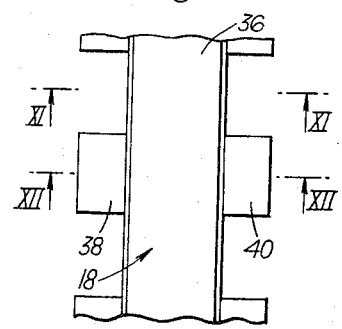
Inventor
HARRY WARD
By
Bailey, Stephens + Huettig
Attorneys 
United States Patent Office 3,245,517
Patented Apr. 12, 1966

3,245,517
SLATTED-TYPE CONVEYOR
Harry Ward, London, England, assignor, by mesne assignments, to AMF International Limited, London, England
Filed June 12, 1964, Ser. No. 374,668
Claims priority, application Great Britain, June 13, 1963, 23,638/63
4 Claims. (Cl. 198—195)

This invention concerns band conveyors which have been developed for use in machines for cutting leaf tobacco. In such machines, leaf tobacco is fed between two conveyors to a mouthpiece through which it passes in order to be cut by knives mounted upon a rotating cutter, the knives having cutting edges moving in a cylindrical path which touches or nearly touches the front face of the mouthpiece. Such a machine is described in British Patent No. 751,093 for example.

The invention is particularly concerned with the construction of the lower conveyor. This conveyor normally comprises a linked metal band and two rollers around which the band runs. The band is formed from slats which extend across the width of the band and which are joined by pins. Some means for supporting the upper run of the band between the rollers is desirable, particularly underneath the portion of the band adjacent to the front roller, since this portion is subjected to considerable pressure as the tobacco is compressed before it is fed through the mouthpiece.

During use of the tobacco cutting machine, grit from the tobacco is liable to pass through cracks between the slats of the band onto the supporting surfaces, and to cause wear of the under surfaces of the band. The thickness through the band may decrease in consequence, so that, where the band is supported by the front roller, the clearance gap between the outer surface of the band and the rear edge of the top surface of the bottom member of the mouthpiece is caused to increase. Tobacco may be lost down this gap and the working of the lower conveyor may be affected by clogging of the tobacco.

The features of the present invention will be explained with reference to one example, which is shown in the accompanying drawings. These drawings show the relevant parts of a tobacco cutting machine.

FIGURE 2 is an enlarged longitudinal section through the front part of the lower conveyor, also showing another portion of the upper run of this conveyor;

FIGURES 3 and 4 are sections on the lines III—III and IV—IV respectively in FIGURE 2;

FIGURE 5 is a plan of the support plate, viewed in the direction of the arrow V in FIGURE 4;

FIGURE 6 is a plan of a fragment of the front roller, seen in the direction of the arrow VI in FIGURE 2;

FIGURES 7 and 8 are fragmentary plans of a driving slat and trailing slat respectively, seen in the direction of the arrows VII and VIII in FIGURE 2;

FIGURES 9 and 10 are sections on the lines IX—IX and X—X in FIGURE 7; and

FIGURES 11 and 12 are sections on the lines XI—XI and XII—XII in FIGURE 8.

Figure 1:
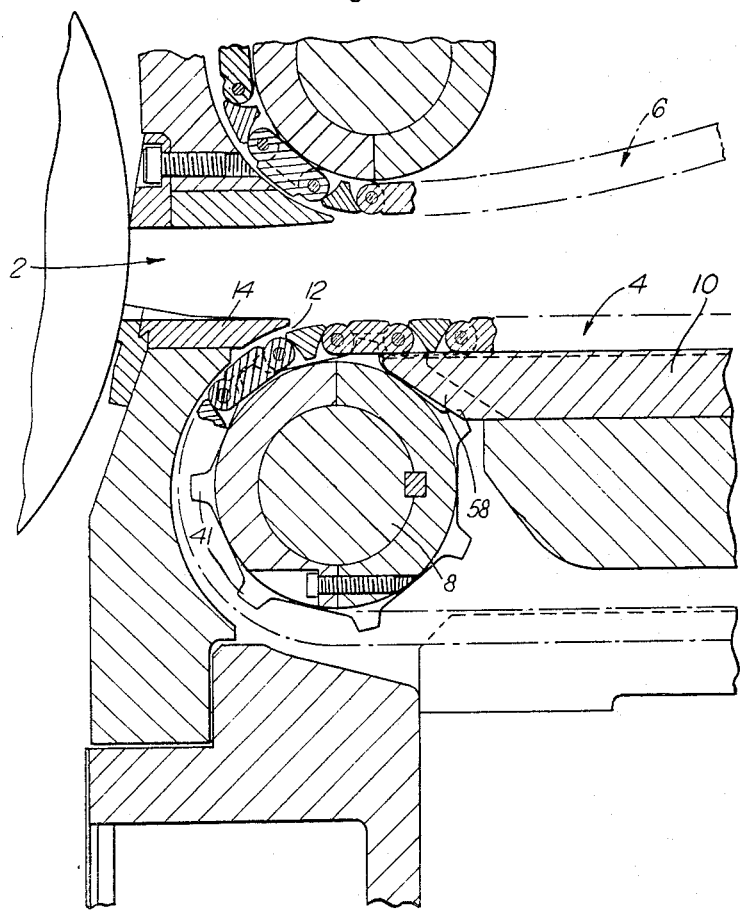
FIGURE 1 is a vertical longitudinal section through the front part of the two conveyors and the mouthpiece.

As shown in FIGURE 1, tobacco is fed to a mouthpiece 2 between the upper run of a lower conveyor 4 and the lower run of an upper conveyor 6. The lower conveyor is driven through a front roller 8, and the upper run of the lower conveyor is supported by a support plate 10. There is a running clearance 12 between the outer surface of the lower conveyor 4, and a rear lower surface of a lower mouthpiece member 14. It is desirable for this clearance to be a minimum, and to remain a minimum during operation of the machine.

Attention is now directed to FIGURES 2 to 12 which are all on the same enlarged scale. The lower conveyor includes the front driving roller 8, a back idler roller (not shown) and a continuously linked band consisting of alternate driving slats 16 and trailing slats 18, linked together by pins 20.

A driving slat 16 is shown in FIGURES 7, 9 and 10, and also in FIGURE 4. It consists of alternate major portions 22 and minor portions 24, presenting a continuous upper surface 26. Each major portion has two barrels 28, 30 projecting forwards and rearwards respectively.

A trailing slat 18 is shown in FIGURES 8, 11 and 12, and also in FIGURE 3. It consists of alternate major portions 32 and minor portions 34, presenting a continuous upper surface 36. Each major portion has two barrels 38 and 40.

The barrels of adjacent driving and trailing slats are interleaved and interlocked by means of the pins 20, as shown in FIGURE 2.

The front driving roller 8 has several series of teeth 41 around it, each series of teeth being spaced out across the width of the roller. The back roller (not shown) has a plain cylindrical surface.

The support plate 10 extends rearwards from close to the front roller, and supports the upper run of the band. The plate has alternate longitudinal ribs 42 and grooves 44 in its upper surface, the grooves being aligned with the teeth 41 on the front roller.

The minor portions 34 of the trailing slats define recesses which are spaced to correspond with the spacing of the teeth on the front roller. That is to say the spacing of the recesses along the width of each trailing slat corresponds to the spacing of the teeth in a series, and the spacing of the trailing slats as they pass around the front roller is equal to the spacing of the series of teeth around the roller.

The inner surfaces of the major portions of the driving and the trailing slats form inner bearing surfaces of the slats. These are so arranged that, as the band passes around the front roller, the inner bearing surfaces 46 of each driving slat lie against the surfaces 48 of the roller between two teeth in successive series, with the rear barrels 30 fitting against the leading faces 50 of a series of teeth. Preferably, as shown, there is clearance between the top surfaces 52 of the teeth and the under surfaces 54 of the minor portions 34 of the trailing slats.

As the band passes over the support plate 10, the inner bearing surfaces 56 of the major portions 32 of the trailing slats are supported by the surfaces of the ribs 42 of the support plate, as shown in FIGURE 3. At the same time, as shown in FIGURE 4, the inner bearing surfaces 46 of the major portions 22 of the driving slats lie above the bottoms of the grooves 44 in the support plate, and do not touch it.

Thus the inner bearing surfaces of the driving slats, which are those supported by the surfaces of the rollers, receive little wear while they are between the rollers, and so the thickness through the driving slats of the band is maintained. The life of the band is thus prolonged considerably by use of the arrangement according to the invention, compared to an arrangement in which those surfaces of the band which are supported by the rollers are also supported by the support plate.

The inner bearing surfaces of the trailing slats will be worn in time by contact with the ribs on the support plate. But such wear will not affect the thickness through the driving slats above their bearing surfaces as the band passes around the rollers. And as the trailing slats are drawn along by their pivotal connections with the driving slats, with their outer surfaces aligned with the outer surfaces of the driving slats, the clearance between the band and the rear edge of the top surface of the bottom member of the mouthpiece is kept at the required setting, as the band passes around the front roller. This is the chief advantage of the arrangement of the lower conveyor according to the invention.

A substantial amount must be worn off the inner bearing surfaces of the trailing slats, or off the ribs themselves, before the inner bearing surfaces of the driving slats will come into contact with the surfaces of the grooves and begin to be worn down.

Preferably, as shown in FIGURES 1 and 2, the front of the support plate 10 is formed with fingers 58 which extend close to the front roller between the teeth of each series.

Preferably also, as shown in FIGURES 2, 4 and 5, a vacuum pipe 60 is arranged to open into the grooves in the support plate, via a manifold 62 and holes 64, and act to remove from the grooves the grit which finds its way through cracks between the slats.

It will be apparent that a conveyor according to the present invention is of value in any situation where material requires to be stripped cleanly off a band and where there is grit present which is liable to cause wear of sliding surfaces.

In the machine shown in FIGURE 1, the upper conveyor is formed of the same slats as the lower conveyor. This is a matter of convenience, but the upper conveyor does not embody the invention, as it has no support plate.

I claim:

1. A conveyor which comprises two rollers, namely a front roller and a back roller, with their axes parallel and a set perpendicular distance apart, the front roller having several series of teeth around it, each series of teeth being spaced out across the width of the roller; a continuous linked band running around the rollers, comprising alternate driving slats and trailing slats which extend substantially across the width of the band, each of the trailing slats and the driving slats having alternate major and minor portions across its width, presenting a continuous upper surface, each major portion having two barrels projecting forwards and rearwards respectively, and the barrels of adjacent driving and trailing slats being interleaved and interlocked by means of pins which pass through holes in the interleaved barrels; and a support plate extending rearwards from close to the front roller, and supporting the upper run of the band, the plate having alternate longitudinal ribs and grooves in its upper surface, the grooves being aligned with the teeth on the front roller; the minor portions of the trailing slats defining recesses spaced to correspond with the spacing of the teeth on the front roller so that they receive the teeth successively as the band passes around the front roller, and the inner surfaces of the major portions of the driving and the traling slats forming inner bearing surfaces for the slats, so arranged that as the band passes around the front roller the inner bearing surfaces of each driving slat lie against surfaces of the roller between two teeth in successive series, with the rear barrels fitting against the leading faces of a series of teeth, and as the band passes over the support plate the inner bearing surfaces of the trailing slats are supported by the surfaces of the ribs of the support plate, while the inner bearing surfaces of the driving slats lie above the bottoms of the grooves in the support plate, and do not touch it.

2. A conveyor according to claim 1, in which there is clearance between the top surfaces of the teeth and the under surfaces of the minor portions of the trailing slats.

3. A conveyor according to claim 1, in which the front of the support plate is formed with fingers which extend close to the front roller between the teeth of each series.

4. A conveyor according to claim 1, including a vacuum pipe which is arranged to open into the grooves in the support plate, and acts to remove grit from them.

References Cited by the Examiner

UNITED STATES PATENTS 2,290,456   7/1942   Stilwell _____ 198—195

SAMUEL F. COLEMAN, *Primary Examiner.*

RICHARD E. AEGERTER, *Examiner.*